United States Patent Office 3,483,885
Patented Dec. 16, 1969

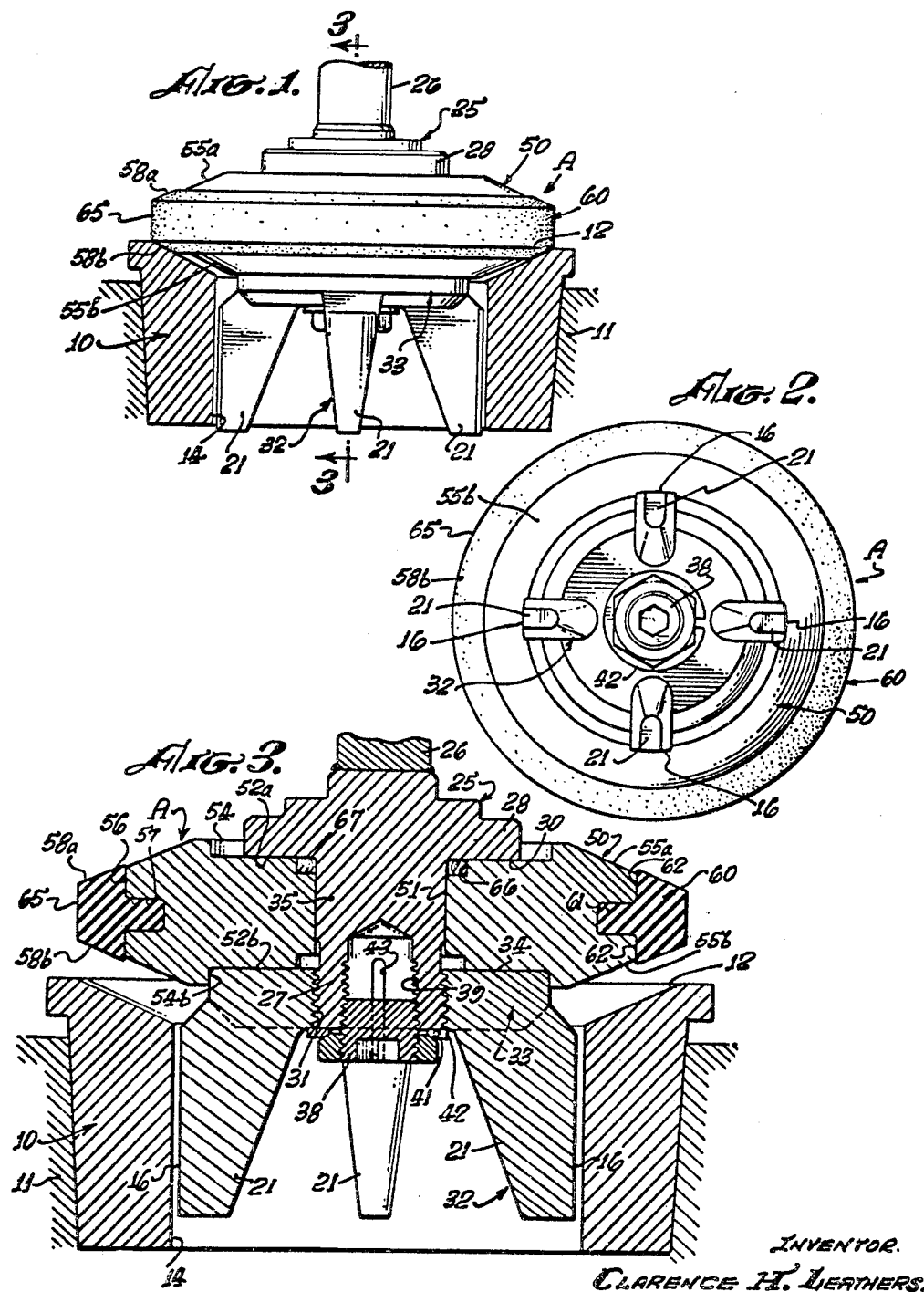

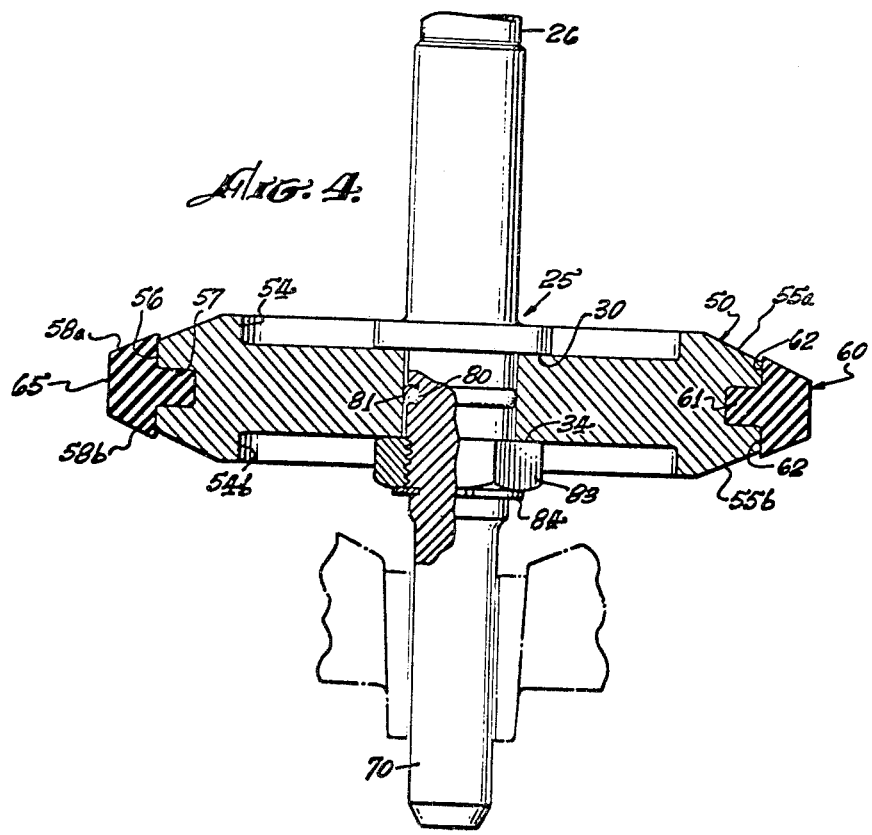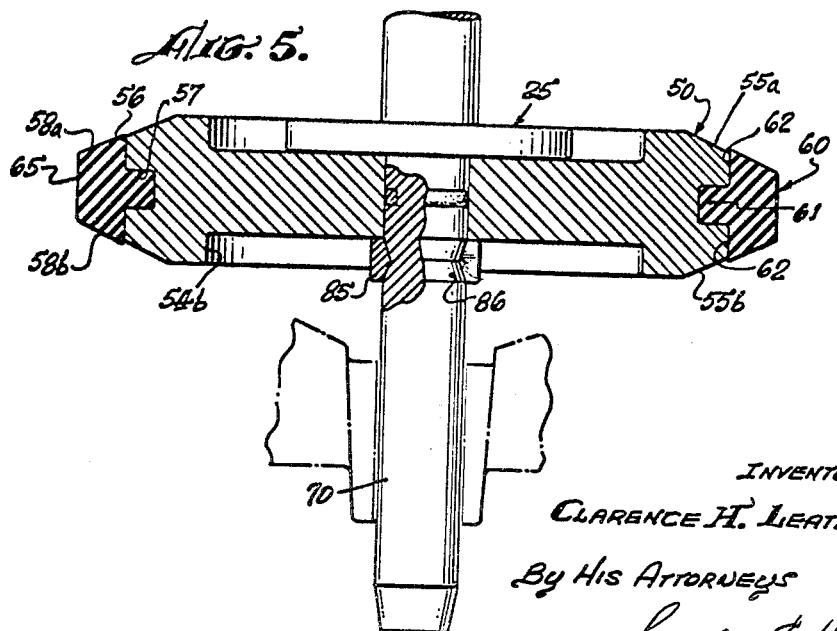

3,483,885
"D" DOWELL VALVE
Clarence H. Leathers, Redondo Beach, Calif., assignor to Grant Oil Tool Company, Los Angeles, Calif., a corporation of California
Filed Mar. 2, 1965, Ser. No. 436,498
Int. Cl. F16k 15/02
U.S. Cl. 137—329.02                    1 Claim

ABSTRACT OF THE DISCLOSURE

An improved valve construction comprising a valve seat, a valve stem, a substantially toroidal unitary holder member removably affixed to said valve stem, about a longitudinal axis thereof, said holder member being so constructed as to be reversibly mateable with said valve seat, and on elastomeric annular sealing member removably affixed about the peripheral surface of said holder member and of such configuration as to provide a reversible seating seal against said valve seat.

---

This invention relates to valves and more particularly to an improved valve element which moves into and out of sealing engagement with a valve seat.

The present invention is particularly useful in fluid inlet and outlet check valves in high pressure pumps, as for example, in oil well pumps, used for sand fracturing, mud pumping and acidizing and will accordingly be described in connection with such use to point out the novel features and utility of the invention. In drilling oil wells, a fluid mixture, commonly known as drilling fluid or "mud," is circulated in the well during the drilling operation by means of high pressure mud pumps. The mud is pumped downwardly through the hollow drill stem, and passes upwardly in the well around the drill stem carrying cuttings removed at the bottom of the hole. As the drilling of wells has become progressively deeper the load on the circulating mud pump has become increasingly great and the pressure required to obtain adequate circulation of the mud has become increasingly high. As a result the inlet and outlet check valves on the circulating pump are opened and closed rapidly and with very great force.

Various valve structures utilized as inlet and outlet check valves for pumps such as mud pumps in the prior state of the art are quickly damaged by the high pressure rapid operation and are soon rendered ineffective to close off fluid flow. In a well known type of mud, pump check valve and metal valve body moves into and out of a valve seat having a tapered annular seting surface. The valve body carries a resilient annular sealing ring having an annular tapered surface engageable with the seating surface. Such construction has been found to be particularly suitable, however, the resilient member portion of the valve is most subject to wear and short useful life. In prior art devices it is necessary to remove and replace the resilient member periodically and such removal and replacement are difficult in prior art constructions.

Accordingly, it is an object of the present invention to provide an improved valve construction in which the parts subject to wear are quickly and easily removed and replaced.

It is another object of the present invention to provide an improved valve construction in which the parts subject to wear can be reversed to extend their useful life.

It is a further object of the present invention to provide an improved valve structure which is simple and economical to fabricate.

Yet another object of the present invention is to provide a valve construction for pumps and the like which has a longer operating life than pump valves heretofore known to the art.

The present invention is a valve body adapted to be moved into and out of sealing engagement with a valve seat having an annular seating surface. The valve body includes a stem with a holder member extending transversely therefrom. The holder is symmetrical about the stem with a circular peripheral surface defining a peripheral groove therein. An annular resilient insert is removably mounted in the peripheral groove. Both the holder and the resilient insert are so constructed as to be reversible upon the stem and means are provided for removing the holder from and reversing its position upon the stem.

The novel features which are believed to be characteristic of the present invention, both as to its organization and method of operation, together with further objects and adavantages thereof, will be better understood from the following description considered in connection with the accompanying drawing in which a presently preferred embodiment of the invention is illustrated by way of example. It is to be exppressly understood, however, that the drawing is for the purpose of illustration and description only, and is not intended as a definition of the limits of the invention.

In the drawings:

FIGURE 1 is a view in elevation of a presently preferred embodiment of the present invention;

FIGURE 2 is a bottom view of the embodiment of FIGURE 1;

FIGURE 3 is a sectional view in elevation taken along line 3—3 of FIGURE 1;

FIGURE 4 is a sectional view in elevation of a first alternative embodiment of the present invention; and FIGURE 5 is a sectional view in elevation of a second alternative embodiment.

Referring to the drawings and particularly to FIGURES 1, 2 and 3, a presently preferred embodiment of the present invention is shown. The valve seat 10 is of the conventional type which is annular and typically formed of a short length of metal tube. The seat 10 is installed in the fluid opening through a mud pump wall 11, conduit, or the like. At its inner surface the valve seat 10 has an annular seating surface 12 which is inclined upwardly. A vertical wall 14 extends downwardly from the seating surface in the orientation of the figures. The junction of the wall 14 and seating surface 12 of the valve seat 10 forms the throat of the valve.

The valve body designated generally as A includes a valve stem 20 together with means for guiding the valve body into and out of sealing engagement with the valve seat. Any suitable guide means for guiding the valve body along the axis of the valve seat can be employed in accordance with the present invention. In the embodiment of FIGURES 1, 2 and 3, guide fingers 21 are utilized. Such guide fingers are of the well known type which comprise several spaced fingers depending from the valve body with an outer surface 16 in close but spaced proximity to the wall 14 of the valve seat to act as guides for the valve movement. The fingers are shaped so as to provide spaced mud flow passages having maximum area and to accommodate the presence of abrasive mud particles to prevent scoring of the port wall 14. The guide fingers are affixed to the the valve stem 25 in a manner more fully described hereinafter. The upper end 26 of the valve stem can be guided in any conventional manner for vertical movement as by reception in a bore of a guide member and can be yieldingly urged to a closed position in the conventional manner as by a spring (not shown). Such guide means and closure means form no part of the present invention, and any suitable means can be utilized. It is the construction of the valve body sealing portion with which the present invention is concerned.

Thus, as shown in FIGURES 2 and 3 there is provided on the valve stem 25 spaced a substantial distance above the lower end 27 thereof a radially protruding member 28 which defines an annular downwardly facing shoulder 30. The shoulder forming member in the embodiment shown is formed as an integral part of the stem but can be separately formed and affixed therto. The lower end 27 of the stem 25 is male threaded and mateable with a female bore 31 through the finger guide member 32. The guide fingers are integral with an upwardly facing shoulder defining member 33 through which the bore 31 is formed. The upwardly facing shoulder 34 is thus defined by the upper surface of the guide member 32 which is threadably mateable with the stem 25. The oppositely facing shoulders 30 and 34 are spaced apart longitudinally such that a generally spool shaped stem portion is defined between the shoulders with the shoulders extending a substantial distance radially beyond the cylindrical mid-portion 35 of the stem. A lock means is provided to insure retention of the guide member 32 on the stem, or more specifically to retain the shoulder 34 in its assembled position. In this embodiment such lock means include a male threaded lock nut 38 which is threadably mateable with a female threaded bore 39 in the lower end of the stem. A radially extending jamming surface 41 is provided on the lock nut and engages a lock ring 42 which in turn spans the thread line between the guide member and stem. A keyway 43 is provided for insertion of a key to prevent rotation of the lock nut. Thus, when assembled with the guide member threaded into position it can be firmly locked against backing off during operation by placing the lock ring 42 over the lock nut 38, threading the lock nut upwardly until the lock ring jams across the threads between the guide member and stem and then inserting a key to prevent rotation of the lock nut. The guide member can be easily removed by reversing the above procedure.

Referring now particularly to FIGURE 3, a holder member 50 is positioned betwen the shoulders 30 and 34 and surrounds the mid portion 35 of the stem. The holder is removable from the stem and is retained in position by the removable shoulder 34. The holder member 50 is in all respects symmetrical. That is, it is symmetrical about an axis which corresponds to the longitudinal axis of the stem in the assembled position and the upper and lower surfaces of the holder member are identical. Thus, the holder 50 is generally toroidal in configuration and defines a bore 51 with a diameter substantially equal to but greater than the diameter of the mid portion 35 of the stem. The opposite bearing faces 52a and 52b of the holder are parallel and extend radially outward to the radius approximately equal to the radius of the upwardly facing shoulder 34 which is greater than that of the downwardly facing shoulder 30 in this embodiment. The upper 52a and lower 52b bearing surfaces are spaced apart and engageable with the shoulders 30 and 34 such as to be retained therebetween. The bearing surfaces 52a and 52b terminate at the longitudinally extending shoulders 54 and 54b from which the upper and lower surfaces of the holder member 50 converge radially outwardly at an angle approximately equal to but slightly greater than the taper angle of the valve seat 11. Thus, convergent valve seating surfaces 55a and 55b are formed on the holder member. Such inclined seating surfaces terminate at the outer peripheral wall 56 of the holder member which is cylindrical in configuration to thus provide a vertical peripheral surface 56. The radius of the peripheral surface 56 is less than the radius of the annular valve seat 11 at the outer edge thereof by a predetermined amount equal to the area of the resilient seating engagement desired in the valve, as will become more apparent hereinafter. A peripheral groove 57 is defined in the vertical wall 56 at the midpoint between the upper and lower surfaces of the holder member 50. The depth and thickness of the groove 57 is predetermined to assure retention of a resilient sealing member described hereinafter while still allowing insertion and removal of the sealing member from the holder member.

The sealing member 60 is also toroidal in configuration with a cross-section as shown in FIGURE 3 having an inwardly extending retention portion 61 mateable with the groove 57 and bearing surfaces 62 extending vertically equal distances from the retention portion which surface 62 is in engagement with the outer vertical wall 56 of the holder member 50. The length of the vertical surfaces 62 extending from the retention leg 61 is slightly greater than the portions of the vertical wall 56 with which they are in contact such that they extend slightly beyond the seating surfaces 55a and 55b. The seating surfaces 58a and 58b formed on the sealing member are outwardly convergent at an angle equal to that of the seating surfaces 55a and 55b and extend to a diameter at which they join the vertical wall 65 which forms the outer wall of the valve body. The sealing member 60 is formed of suitable elastomeric material for seating engagement with the annular valve seat 11. Thus, it can be seen that the sealing member is of generally T-shaped toroidal cross-section with the leg adapted to engage the peripheral groove of the holder member and with the upper and lower seating surfaces 58a and 58b equally spaced from the midpoint of the holder member. Both of the seating surfaces 58a and 58b are adapted for sealing engagement with the valve seat.

An annular groove 66 is provided at the junction of the bore 51 with both the upper and lower bearing surfaces 52a and 52b of the holder member. The groove is adapted to receive an O-ring 67 to provide a fluid seal between the holder member 50 and the valve stem.

Thus, it can be seen that the holder member with the sealing member attached thereto can be reversed in orientation upon the valve stem such that either the upper sealing surface 58a or the lower sealing surface 58b, as shown in the figure, can be used for sealing engagement. When one surface such as 58b has been sufficiently worn or damaged during operation of the valve as to no longer provide an effective seal, the holder member can be removed as described hereinbefore by removing the guide member 32 after which the holder member can be reversed to utilize the sealing surface 58a. When both surfaces have been destroyed or rendered ineffective the sealing member 60 can be removed from the holder member and replaced.

Referring now to FIGURE 4 an alternative embodiment of the present invention is shown to illustrate the utility of the present invention in connection with a stem guided valve body. Thus, in the embodiment of FIGURE 4 the stem is formed without guide fingers but with an extended lower portion 70 adapted to be received within the bore of a spider for guidance of the valve body in the conventional manner.

In the embodiment of FIGURE 4 the holder member is formed as previously described, as is the resilient member. In this embodiment the O-ring groove 80 is formed in the mid-portion of the stem to accommodate an O-ring 81. The downwardly facing 30 and upwardly facing 34 shoulders in this embodiment are of lesser radial extent and the upwardly facing shoulder 34 is defined by the upper surface of the lock nut 83. A snap ring 84 is inserted into a groove in the stem beneath the lock nut to retain it in position.

In the second alternative embodiment of FIGURE 5, the holder member 50 and sealing member 60 are again as previously described except for omission of the O-ring grooves in the holder. The valve of FIGURE 5 is again a stem guided valve and is comparable in all respects to that shown in FIGURE 4 except for the lock means which is simplified in this embodiment for applications of the valve in which the valve is subjected to less forces tending to force the holder member from its mounted position on the stem. Thus, in this embodiment the upwardly facing shoulder is provided by the lock ring 85 which is friction fitted into a mating groove 86 in the stem beneath the holder member 50. The groove 86 formed in the stem has tapered side walls in the manner of a shallow V and the inner surfaces of the lock ring 85 are mateable therewith. The lock-ring of this embodiment is resilient to urge a seating force of the ring into the groove. By reason of such tapered walls on the ring and groove the ring will tend to reseat itself if moved slightly by forces exerted on the holder member. Further, such tapered walls make removal and replacement simple and efficient since no special removal tools are necessary.

Accordingly, the present invention provides an improved valve construction in which the resilient sealing member can be reversed for double life as well as be easily removed and replaced.

What is claimed is:

1. A valve body adapted to be movable along the longitudinal axis thereof into and out of sealing engagement with an annular tapered valve seat radially spaced from said axis comprising:

a valve stem;

a holder member removably affixed to said stem and extending transversely therefrom, said holder member being of unitary construction and substantially toroidal in shape and defining a single opening therethrough mateable with said valve stem, said holder member having similar upper and lower inclined transverse surfaces adapted to be reversed in orientation upon said stem, said holder member defining a circular peripheral outer surface having a diameter approximately equal to the inside diameter of said annular seat, said peripheral surface defining a radially inwardly extending groove at the midpoint thereof; and, An annular elastromeric sealing member removably affixed to said peripheral surface, said sealing member having an inner surface mateable with said peripheral surface and a radially inward protrusion engageable in said groove, said sealing member having an upper and lower tapered surface each of which is mateable with said tapered seating surface when holder is reversed in orientation;

said tapered surfaces of said sealing member lying in planes outwardly of planes containing the said upper and lower inclined transverse surfaces of said holder member, said tapered surface of said sealing member opposite said valve seat being free to move away from said valve seat when said holder member moves into seating engagement with said valve seat.

References Cited

UNITED STATES PATENTS

| | | | |
|---|---|---|---|
| 735,039 | 7/1903 | O'Meara | 137—329.02 |
| 2,792,016 | 5/1957 | Shellman et al. | 137—516.29 |

WILLIAM F. O'DEA, Primary Examiner

DAVID R. MATTHEWS, Assistant Examiner

U.S. Cl. X.R.

137—51629